United States Patent
Tindell et al.

[11] Patent Number: 5,934,611
[45] Date of Patent: Aug. 10, 1999

[54] LOW DRAG INLET DESIGN USING INJECTED DUCT FLOW

[75] Inventors: Runyon H. Tindell, Old Bethpage; Charles A. Parente, Oyster Bay, both of N.Y.

[73] Assignee: Northrop Grumman Corporation, Los Angeles, Calif.

[21] Appl. No.: 08/954,553

[22] Filed: Oct. 20, 1997

[51] Int. Cl.[6] ................................. B64D 33/02
[52] U.S. Cl. ................. 244/53 B; 244/205; 244/130; 181/214; 415/119
[58] Field of Search .................. 244/1 N, 200, 244/203, 204, 207, 208, 209, 210, 58 B, 130; 181/214; 415/119

[56] References Cited

U.S. PATENT DOCUMENTS

| | | |
|---|---|---|
| 2,207,242 | 7/1940 | De Seversky . |
| 2,270,912 | 1/1942 | Theodorsen . |
| 2,343,655 | 3/1944 | Flader et al. . |
| 2,589,945 | 3/1952 | Leduc . |
| 2,624,281 | 1/1953 | McNally . |
| 2,861,419 | 11/1958 | Hausmann . |
| 2,865,580 | 12/1958 | Marshall . |
| 2,931,167 | 4/1960 | Leduc ........................................ 244/1 N |
| 3,128,973 | 4/1964 | Dannenberg ............................ 244/130 |
| 3,261,576 | 7/1966 | Valyi ........................................ 244/130 |
| 3,799,475 | 3/1974 | Mitchell et al. ....................... 244/53 B |
| 3,821,999 | 7/1974 | Guess et al. ......................... 244/1 N X |
| 4,000,869 | 1/1977 | Wong et al. ............................ 244/53 B |
| 4,007,891 | 2/1977 | Sorensen et al. ...................... 244/53 B |
| 4,381,017 | 4/1983 | Bissinger ............................ 244/53 B X |
| 4,620,679 | 11/1986 | Karanian ................................ 244/53 B |
| 4,749,150 | 6/1988 | Rose et al. ........................... 244/130 X |
| 5,222,698 | 6/1993 | Nelson et al. ........................... 244/203 |
| 5,485,975 | 1/1996 | Tindell .................................... 244/53 B |
| 5,743,488 | 4/1998 | Rolston et al. ......................... 244/53 B |
| 5,803,410 | 9/1998 | Hwang .................................... 244/208 |

Primary Examiner—Galen L. Barefoot
Attorney, Agent, or Firm—Terry J. Anderson; Karl J. Hoch, Jr.

[57] ABSTRACT

An air intake system disposable in an air vehicle turbo engine housing disposed in an exterior airflow for selectively reducing external engine boundary layer separation drag and external engine friction drag on the engine housing comprising an air inlet member for receiving engine intake air disposable within the engine housing. The air intake system further comprising a first air exit port disposed in fluid communication with the air inlet member, adapted to direct intake air from the air inlet member and to direct intake air substantially in the direction of exterior airflow, to reduce external engine boundary layer separation drag. The air intake system further comprising a second air exit port disposed in fluid communication with the air inlet member, adapted to direct intake air from the air inlet member and to direct intake air substantially in a direction perpendicular to the exterior airflow, to reduce external engine friction drag. The air intake system further comprising a control device for regulating intake airflow through the first and second air exit ports in response to sensed external engine conditions to mitigate at least one of external engine boundary layer separation drag and external engine friction drag.

21 Claims, 1 Drawing Sheet

LOW DRAG INLET DESIGN USING INJECTED DUCT FLOW

FIELD OF THE INVENTION

The present invention relates generally to air vehicle engine air intake systems, and more particularly to air intake systems designed to reduce engine drag.

BACKGROUND OF THE INVENTION

Drag occurs on the external surface of air vehicle engines due to friction, as is frequently encountered when the air vehicle is operated in a level flight mode. In addition, drag occurs on the external surface of air vehicle engines due to boundary layer separation. Under certain circumstances, an initial laminar fluid boundary layer flow over a surface may transition to a turbulent flow or a boundary layer separation flow, which results in an appreciable increase in surface drag. Boundary layer separation may occur when the air vehicle is operated at high angles of attack or when localized air speed adjacent the leading edge of the engine is transonic.

Boundary layer separation drag may be especially problematic for commercial aircraft when, for example, the aircraft is in climb maneuver and an engine fails or experiences engine burn-out. In such a circumstance, the aircraft may undergo significant drag induced moments, which may result in loss of aircraft control.

Previous boundary layer separation drag reduction efforts include engine exterior surface contouring. Such surface contouring, however, must accommodate specific aerodynamic requirements of various flight operating regimes (e.g., take-off, climb, level flight, engine burn-out) and flight velocities. Such accommodations result in inefficient drag reduction over all flight conditions. In addition, surface contouring results in significant increases in manufacturing costs and air vehicle weight penalties.

Other boundary layer separation drag reduction efforts include air suction devices which suck air into the engine surface in order to reduce the occurrence of the boundary layer separation phenomenon. Such an approach, however, necessarily employs suction pumps with associated weight, space and cost penalties.

Accordingly, it is desirable to design an engine drag reduction system which is relatively low cost, is able to achieve drag reduction across a range of flight operating conditions, does not increase drag under any flight operating conditions and does not substantially increase the weight of the aircraft.

In addition, conventional noise reduction schemes have focused at the inner surface of the engine. Conventional schemes allow intake engine air to enter the inner surface of the engine through a plurality of small pores. Each pore corresponds to a cavity or cell. Air is not allowed to flow through the cell, but rather becomes trapped in the cell. Thus, the conventional noise reduction scheme is a no-flow system. The geometry and dimensions of each cell is a function of sound wave lengths associated with undesirable sounds. It is desirable to design an drag reduction system which could integrate existing noise reduction designs.

SUMMARY OF THE INVENTION

In accordance with the present invention, an air intake system disposable in an air vehicle turbo engine housing disposed in an exterior airflow for selectively reducing external engine boundary layer separation drag and external engine friction drag on the engine housing comprising an air inlet member for receiving engine intake air disposable within said engine housing. The air intake system further comprising a first air exit port disposed in fluid communication with said air inlet member, adapted to direct intake air from said air inlet member and to direct intake air substantially in the direction of exterior airflow, to reduce external engine boundary layer separation drag. The air intake system further comprising a second air exit port disposed in fluid communication with said air inlet member, adapted to direct intake air from said air inlet member and to direct intake air substantially in a direction perpendicular to the exterior airflow, to reduce external engine friction drag. The air intake system further comprising a control device for regulating intake airflow through said first and second air exit ports in response to sensed external engine conditions to mitigate at least one of external engine boundary layer separation drag and external engine friction drag.

In addition, in the air intake system of the present invention, it is preferable that the air inlet member is provided with an intake air noise reduction device.

In addition, in the air intake system of the present invention, the intake air noise reduction device is provided with a plurality of noise reduction cells. In addition, the air inlet member is further provided with a plurality of pressure conduits for receiving intake air from the noise reduction cells, each of the noise reduction cells corresponding to and in fluid communication with respective ones of the pressure conduits, each of the noise reduction cells defining a maximum cross sectional airflow area, each of the pressure conduits defining a maximum cross sectional airflow area, and the maximum cross sectional airflow area of each of the noise reduction cells being greater than the maximum cross sectional airflow area of each of the pressure conduits. In addition, it is preferable that the air inlet member be provided with a plurality of air inlet pores, each of the air inlet pores corresponding to and in fluid communication with respective ones of the noise reduction cells. In another embodiment of the present invention, the first air exit port is provided with a plurality of air exit jets.

In another embodiment of the present invention, the second exit port is provided with a plurality of exit pores. In addition, in the air intake system of the present invention, second exit port is further provided with an exit plenum adapted to deliver intake air to the exit pores at variable airflow rates with respect to respective ones of the exit pores.

In another embodiment of the present invention, the air intake system of the present invention is further provided with an engine drag sensing device in communication with said control device. The control device for regulating airflow through said first and second air exit ports further responds to sensed engine drag conditions.

In another embodiment of the present invention, the air intake system of the present invention further comprises an environmental sensing device in communication with said control device. The control device for regulating airflow through said first and second air exit ports further responds to sensed environmental conditions.

In another embodiment of the present invention, the control device is provided with at least one first port valve disposable in the first air exit port for regulating intake airflow through the first air exit port and at least one second port valve disposable in said second air exit port for regulating intake airflow through the second air exit port.

In addition, in additional embodiments of the present invention, the air intake system may be disposed within an air vehicle, turbo engine, and turbo engine housing.

In another embodiment of the present invention, a turbo engine noise reduction system disposable in an air vehicle turbo engine housing disposed in an exterior airflow for reducing external engine drag on the engine housing is provided with an air inlet member for receiving engine intake air disposable within said engine housing, provided with a plurality of intake air noise reduction cells. The noise reduction system is further provided with an air exit port disposed in fluid communication with said air inlet member, adapted to direct intake air from said air inlet member to reduce the external engine drag. The noise reduction system is further provided with a control device for regulating intake airflow through said exit ports in response to sensed external engine conditions to mitigate the external engine drag.

In addition, in another embodiment of the present invention, the air inlet member is provided with a plurality of pressure conduits for receiving intake air from said noise reduction cells, the noise reduction cells corresponding to and in fluid communication with respective ones of the pressure conduits, the noise reduction cells defining a maximum cross sectional airflow area, the pressure conduits defining a maximum cross sectional airflow area, and the maximum cross sectional airflow area of each of the noise reduction cells being greater than the maximum cross sectional airflow area of each of the pressure conduits.

In addition, in another embodiment of the present invention, the air exit port is provided with first and second portions, said first portion disposed in fluid communication with said air inlet member, adapted to direct intake air from said air inlet member and to direct intake air substantially in the direction of exterior airflow, to reduce external engine boundary layer separation drag, and said second portion disposed in fluid communication with said air inlet member, adapted to direct intake air from said air inlet member and to direct intake air substantially in a direction perpendicular to the exterior airflow, to reduce external engine friction drag.

In addition, in another embodiment of the present invention, a method for reducing turbo engine noise while reducing engine drag on an engine housing disposed in an exterior airflow comprising the following steps: (a) forming an air inlet member for receiving engine intake air disposable within said engine housing, the air inlet member provided with a plurality of noise reduction cells, the noise reduction cells defining a maximum cross sectional air flow area, the air inlet member further provided with a plurality of pressure conduits, the noise reduction cells corresponding to and in fluid communication with respective ones of the pressure conduits, the pressure conduits defining a maximum cross sectional airflow area, and the maximum cross sectional airflow area of each of the noise reduction cells being greater than the maximum cross sectional airflow area of each of the pressure conduits; (b) forming an air exit port disposed in fluid communication with the air inlet member adapted to reduce the external engine drag; and (c) regulating intake airflow through the air exit port in response to sensed external engine conditions to mitigate the external engine drag.

In addition, step (b) further includes forming the air exit port into a first exit portion and a second exit portion, the first exit portion adapted to direct intake air from the pressure conduits and to direct intake air substantially in the direction of exterior airflow, to reduce external engine boundary layer separation drag, and the second exit portion adapted to direct intake air from the pressure conduits and to direct intake air substantially in a direction perpendicular to the exterior airflow, to reduce external engine friction drag.

The present invention addresses the various problems associated with previous drag reduction systems by utilizing intake air flow to selectively reduce boundary layer separation drag and friction drag in a single integrated system. In addition, the present invention uniquely integrates with existing noise reduction designs.

The present invention overcomes prior drag reduction efforts because it does not increase aerodynamic drag in any flight operating regime. The present invention overcomes the negative impacts of prior drag reduction efforts because engine surface contouring is not employed, thereby avoiding associated manufacturing costs and weight and aerodynamic penalties. Further, the present invention does not require any external engine surface suction devices with inherent weight, space and cost penalties.

Advantageously, the present invention is integratable with conventional noise reduction designs. The present invention contemplates modifying conventional noise reduction designs to allows airflow through noise reduction cells. Because the present invention uniquely integrates with existing noise reduction designs, inner engine surface designs need not be substantially modified in order to practice the present invention with conventional noise reduction designs.

BRIEF DESCRIPTION OF THE DRAWINGS

These, as well as other features of the present invention, will become more apparent upon reference to the drawings wherein.

DETAILED DESCRIPTION OF THE PREFERRED EMBODIMENT

Figure 1:
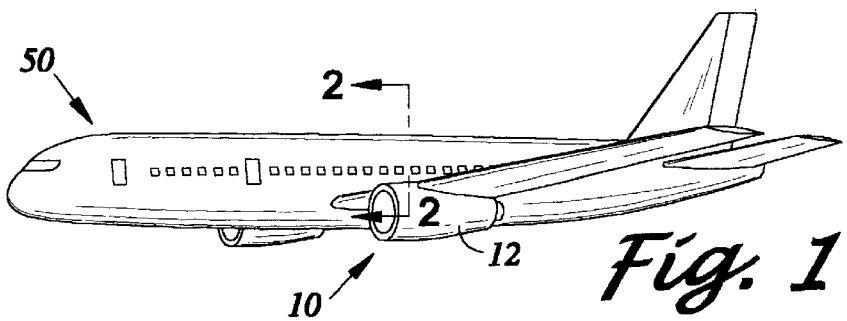
FIG. 1 is a perspective view of the present invention.

Referring now to the drawings wherein the showings are for purposes of illustrating a preferred embodiment of the present invention only, and not for purposes of limiting the same, FIGS. 1, 2, 2a and 3 illustrate an air intake system 10 which is constructed in accordance with the present invention. As will be described in more detail below, the air intake system 10 is designed to selectively reduce boundary layer separation drag and friction drag resulting from exterior airflow. In addition, the air intake system 10 is designed to be integrated with engine noise reduction hardware.

Figure 2:
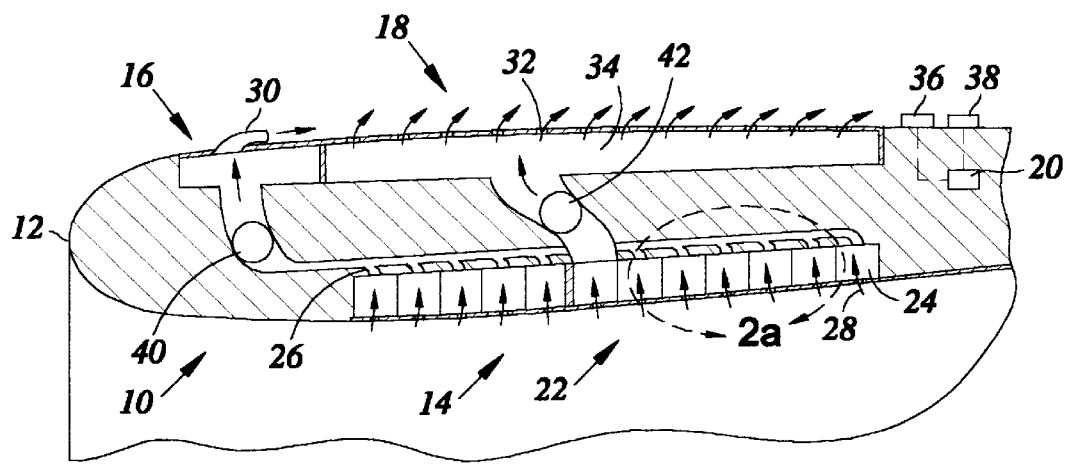
FIG. 2 is a cross-sectional view of the engine housing depicting the air intake system with a plurality of exit ports.
Figure 2A:
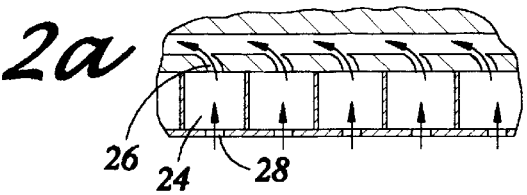
FIG. 2a is an exploded cross-sectional view of the air inlet member as shown in FIG. 2.

Referring now to FIGS. 1 and 2, an air intake system 10 disposable in an air vehicle turbo engine housing 12 for selectively reducing external engine boundary layer separation drag and external engine friction drag on the engine housing 12 disposed in an exterior airflow comprising an air inlet member 14 for receiving engine intake air disposable within said engine housing 14.

The air intake system 10 is further provided with a first air exit port 16 disposed in fluid communication with said air inlet member 14, adapted to direct intake air from said air inlet member 14 and to direct intake air substantially in the direction of exterior airflow, to reduce external engine boundary layer separation drag.

The air intake system 10 is further provided with a second air exit port 18 disposed in fluid communication with said air inlet member 14, adapted to direct intake air from said air inlet member 14 and to direct intake air substantially in a direction perpendicular to the exterior airflow, to reduce external engine friction drag.

The air intake system 10 is further provided with a control device 20 for regulating intake airflow through said first exit port 16 and second air exit port 18 in response to sensed external engine conditions to mitigate at least one of the external engine boundary layer separation drag and the external engine friction drag.

It is contemplated that the present invention be practiced in an air vehicle having a subsonic or supersonic velocity. It is further contemplated that the present invention be practiced in air vehicles operating at level to high angles of attack with respect to ambient airflow.

It is contemplated that when engine boundary layer separation occurs, the first air exit port 16 will be activated to inject intake air in the general direction of exterior airflow. It is contemplated that sufficient injected airflow will increase the moment of the exterior airflow and eliminate boundary separation or cause reattachment of the boundary layer. One with ordinary skill in the art will recognize that the positioning of the first exit port 16 will be optimized in order to achieve efficient elimination of boundary separation. Furthermore, one with ordinary skill in the art will recognize that the first exit port 16 may be sized and configured to minimize aerodynamic penalties associated with its structure.

It is contemplated that when engine friction occurs, the second air exit port 18 will be activated to inject intake air in the direction substantially perpendicular to the exterior airflow. It is contemplated that this injected intake air will have a surface smoothing effect thereby reducing friction drag. One with ordinary skill in the art will recognize that the size, configuration and positioning of the second air exit port 18 may be optimized in order to achieve efficient elimination of friction drag. Furthermore, one with ordinary skill in the art will recognize that the second exit port 18 may be sized and configured to minimize aerodynamic penalties associated with its structure.

In addition, wherein the air intake system 10 of the present invention, the air inlet member 14 is provided with an intake air noise reduction device 22. In addition, referring now to FIG. 2a, it is preferred that the intake air noise reduction device 22 is further provided with a plurality of noise reduction cells 24. It is contemplated that the noise reduction cells 24 are sized and configured in a functional relationship to sound wave lengths associated with sounds which are desired to be reduced.

In addition, it is preferred that the air inlet member 14 is further provided with a plurality of pressure conduits 26 for receiving intake air from the noise reduction cells 24, the noise reduction cells 24 corresponding to and in fluid communication with respective ones of the pressure conduits 26, the noise reduction cells 24 defining a maximum cross sectional airflow area, the pressure conduits 26 defining a maximum cross sectional airflow area, and said maximum cross sectional airflow area of the noise reduction cells 24 being greater than said maximum cross sectional airflow area of the pressure conduits 26.

In addition, it is preferred that the air inlet member 14 is further provided with a plurality of air inlet pores 28, the air inlet pores 28 corresponding to and in fluid communication with respective ones of each of the noise reduction cells 24.

Although not depicted, it is contemplated that the air inlet pores 28 be distributed across a significant portion of the engine housing having an annular inner surface through which intake air is drawn into the engine. One with ordinary skill in the art will recognize that the air inlet pores 28 may be sized and configured to minimize aerodynamic penalties associated with its structure.

In addition, it is preferred that the first air exit port 16 is provided with a plurality of air exit jets 30. One with ordinary skill in the art will recognize that the air exit jets 30 may be adapted to inject air at variable directions with respect to respective ones of the air exit jets 30. Further, one with ordinary skill in the art will recognize that the control device 20 may further regulate the injected air direction from respective ones of the air exit jets 30 and that the air exit jets 30 may be adapted to inject intake air at variable airflow rates with respect to respective ones of the air exit jets 30.

In addition, it is preferred that the second exit port 18 is further provided with a plurality of exit pores 32. One with ordinary skill in the art will recognize that the exit pores 32 may be adapted to inject intake air at variable airflow rates with respect to respective ones of the exit pores 32. Although not depicted, it is contemplated that the exit pores 32 be distributed across a significant portion of the engine housing 12.

In addition, it is preferred that the second exit port 18 is further provided with an exit plenum 34 adapted to deliver intake air to each of the exit pores 32 at variable airflow rates with respect to respective ones of the exit pores 32.

In addition, it is preferred that the air intake system 10 of the present invention is further provided with an engine drag sensing device 36 in communication with said control device 20. The control device 20 for regulating airflow through the first air exit port 16 and the second air exit port 18 further responses to sensed external engine drag conditions.

In addition, it is preferred that the air intake system 10 of the present invention is further provided with an environmental sensing device 38 in communication with the control device 20. The control device 20 for regulating airflow through the first air exit port 16 and the second air exit port 18 further responses to environmental conditions. One with ordinary skill in the art will recognize that the environmental sensing device may detect, for example, ambient and engine housing surface temperatures, pressures, relative air velocity, and relative air direction. It is contemplated that the control device is responsive to one or more sensed conditions.

In addition, it is preferred that the control device 20 is provided with at least one first port valve 40 disposable in said first air exit port 16 for regulating intake airflow through said first air exit port 16 and at least one second port valve 42 disposable in said second air exit port 18 for regulating intake airflow through said second air exit port 18. It is contemplated that the first and second air exit ports may be operated either independently or concurrently as controlled by the respective valves. It is further contemplated that the first and second air exit ports may be operated concurrently with differential airflows as controlled by the respective valves.

In addition, it is contemplated that in additional embodiments of the present invention, the air intake system 10 be disposed within an air vehicle 50, turbo engine 52, and turbo engine housing 10. It is further contemplated that the turbo engine 52 be attachable to the wings of the air vehicle 50, as is depicted in FIG. 1, or the fuselage of the air vehicle. One with ordinary skill in the art will also recognize that the turbo engine 52 may be integral to the wings of the air vehicle 50 or the fuselage of the air vehicle 50. In such a case, the engine housing 12 may form a portion of the wing or fuselage.

Figure 3:
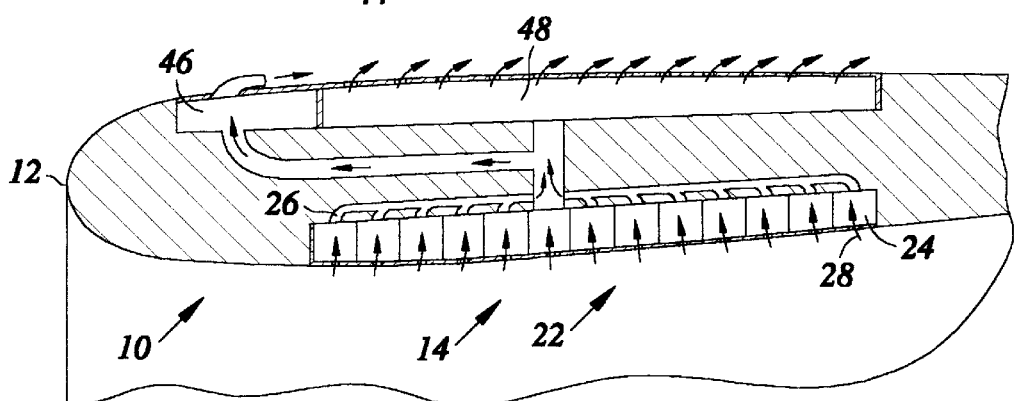
FIG. 3 is a cross-sectional view of the engine depicting another embodiment of the present invention.

As illustrated in FIG. 3, in accordance with the present invention, a method for reducing turbo engine noise while reducing engine drag comprising the following steps: Step (a) forming an air inlet member 14 for receiving engine intake air disposable within said engine housing 12, said air inlet member 14 comprising a plurality of noise reduction cells 24, each noise reduction cell 24 defining a maximum cross sectional airflow area, said air inlet member 14 further comprising a plurality of pressure conduits 26, each noise reduction cell 24 corresponding to and in fluid communication with respective ones of the pressure conduits 26, each of the pressure conduits 26 defining a maximum cross sectional airflow area, and said maximum cross sectional airflow area of the noise reduction cells 24 being greater than said maximum cross sectional airflow area of the pressure conduits 26. Step (b) forming an air exit port 44 disposed in fluid communication with said air inlet member 14, adapted to reduce external engine drag. Step (c) regulating intake airflow through said air exit port 44 in response to sensed external engine conditions.

In addition, as illustrated in FIG. 3, in accordance with another embodiment if the present invention, wherein the method for reducing turbo engine noise while reducing engine drag, step (b) further comprising forming said air exit port 44 into a first exit portion 46 and a second exit portion 48, said first exit portion 46 adapted to direct intake air from said pressure conduits 26 and to direct intake air substantially in the direction of exterior airflow, to reduce external engine boundary layer separation drag, and said second exit portion 48 adapted to direct intake air from said pressure conduits 26 and to direct intake air substantially in a direction perpendicular to the exterior airflow, to reduce external engine friction drag.

Additional modifications and improvements of the present invention may also be apparent to those of ordinary skill in the art. Thus, the particular combination of parts described and illustrated herein is intended to represent only one embodiment of the present invention, and is not intended to serve as limitations of alternative devices within the spirit and scope of the invention.

What is claimed is:

1. An air intake system disposable in an air vehicle turbo engine housing disposed in an exterior airflow for selectively reducing external engine boundary layer separation drag and external engine friction drag on the engine housing comprising:
   an air inlet member for receiving engine intake air disposable within said engine housing;
   a first air exit port disposed in fluid communication with said air inlet member, adapted to direct intake air from said air inlet member and to direct intake air substantially in the direction of exterior airflow, to reduce the external engine boundary layer separation drag;
   a second air exit port disposed in fluid communication with said air inlet member, adapted to direct intake air from said air inlet member and to direct intake air substantially in a direction perpendicular to the exterior airflow, to reduce the external engine friction drag; and
   a control device for regulating intake airflow through said first and second air exit ports in response to sensed external engine conditions to mitigate at least one of the external engine boundary layer separation drag and the external engine friction drag.

2. The air intake system of claim 1 wherein said air inlet member comprises an intake air noise reduction device.

3. The air intake system of claim 2 wherein said intake air noise reduction device comprises a plurality of noise reduction cells.

4. The air intake system of claim 3 wherein said air inlet member comprises a plurality of pressure conduits for receiving intake air from the noise reduction cells, each of the noise reduction cells corresponding to and in fluid communication with respective ones of the pressure conduits, each of the noise reduction cells defining a maximum cross sectional airflow area, each of the pressure conduits defining a maximum cross sectional airflow area, and the maximum cross sectional airflow area of each of the noise reduction cells being greater than the maximum cross sectional airflow area of each of the pressure conduits.

5. The air intake system of claim 3 wherein said air inlet member comprises a plurality of air inlet pores, each of the air inlet pores corresponding to and in fluid communication with respective ones of the noise reduction cells.

6. The air intake system of claim 1 wherein said first air exit port comprises a plurality of air exit jets.

7. The air intake system of claim 1 wherein said second exit port comprises a plurality of exit pores.

8. The air intake system of claim 7 wherein said second exit port further comprises an exit plenum adapted to deliver intake air to the exit pores at variable airflow rates with respect to respective ones of the exit pores.

9. The air intake system of claim 1 further comprising an engine drag sensing device in communication with said control device, and said control device for regulating airflow through said first and second air exit ports in further response to sensed external engine drag conditions.

10. The air intake system of claim 1 further comprising an environmental sensing device in communication with said control device, and said control device for regulating airflow through said first and second air exit ports in further response to sensed environmental conditions.

11. The air intake system of claim 1 wherein said control device comprises at least one first port valve disposable in said first air exit port for regulating intake airflow through said first air exit port and at least one second port valve disposable in said second air exit port for regulating intake airflow through said second air exit port.

12. A selective drag reduction air vehicle disposed in an exterior airflow comprising a turbo engine comprising:
   an engine housing;
   an air inlet member for receiving engine intake air disposable within said engine housing;
   a first air exit port disposed in fluid communication with said air inlet member, adapted to direct intake air from said air inlet member and to direct intake air substantially in the direction of exterior airflow, to reduce the external engine boundary layer separation drag;
   a second air exit port disposed in fluid communication with said air inlet member, adapted to direct intake air from said air inlet member and to direct intake air substantially in a direction perpendicular to the exterior airflow, to reduce the external engine friction drag; and
   a control device for regulating intake airflow through said first and second air exit ports in response to sensed external engine conditions to mitigate at least one of the external engine boundary layer separation drag and the external engine friction drag.

13. The air vehicle of claim 12 wherein said air inlet member comprises an intake air noise reduction device.

14. A turbo engine disposed in an exterior airflow which selectively reduces external engine boundary layer separation drag and external engine friction drag comprising:
   an engine housing;
   an air inlet member for receiving engine intake air disposable within said engine housing;

a first air exit port disposed in fluid communication with said air inlet member, adapted to direct intake air from said air inlet member and to direct intake air substantially in the direction of exterior airflow, to reduce the external engine boundary layer separation drag;

a second air exit port disposed in fluid communication with said air inlet member, adapted to direct intake air from said air inlet member and to direct intake air substantially in a direction perpendicular to the exterior airflow, to reduce the external engine friction drag; and a control device for regulating intake airflow through said first and second air exit ports in response to sensed external engine conditions to mitigate at least one of the external engine boundary layer separation drag and the external engine friction drag.

15. The turbo engine of claim 14 wherein said air inlet member comprises an intake air noise reduction device.

16. A turbo engine housing disposed in an exterior airflow which selectively reduces boundary layer separation drag and friction drag comprising:

an air inlet member for receiving engine intake air;

a first air exit port disposed in fluid communication with said air inlet member, adapted to direct intake air from said air inlet member and to direct intake air substantially in the direction of exterior airflow, to reduce the external engine boundary layer separation drag;

a second air exit port disposed in fluid communication with said air inlet member, adapted to direct intake air from said air inlet member and to direct intake air substantially in a direction perpendicular to the exterior airflow, to reduce the external engine friction drag; and a control device for regulating intake airflow through said first and second air exit ports in response to sensed external engine conditions to mitigate at least one of the external engine boundary layer separation drag and the external engine friction drag.

17. The turbo engine housing of claim 16 wherein said air inlet member comprises an intake air noise reduction device.

18. A turbo engine noise reduction system disposable in an air vehicle turbo engine housing disposed in an exterior airflow for reducing external engine drag on the engine housing comprising:

an air inlet member for receiving engine intake air disposable within said engine housing, comprising a plurality of intake air noise reduction cells;

an air exit port disposed in fluid communication with said air inlet member, said air exit port comprising first and second portions, said first portion disposed in fluid communication with said air inlet member, adapted to direct intake air from said air inlet member and to direct intake air substantially in the direction of exterior airflow, to reduce external engine boundary layer separation drag, and said second portion disposed in fluid communication with said air inlet member, adapted to direct intake air from said air inlet member and to direct intake air substantially in a direction perpendicular to the exterior airflow, to reduce external engine friction drag; and a control device for regulating intake airflow through said exit ports in response to sensed external engine conditions to mitigate the external engine drag.

19. The turbo engine noise reduction system of claim 18 wherein said air inlet member comprising a plurality of pressure conduits for receiving intake air from said noise reduction cells, the noise reduction cells corresponding to and in fluid communication with respective ones of the pressure conduits, the noise reduction cells defining a maximum cross sectional airflow area, the pressure conduits defining a maximum cross sectional airflow area, and the maximum cross sectional airflow area of each of the noise reduction cells being greater than the maximum cross sectional airflow area of each of the pressure conduits.

20. A method for reducing turbo engine noise while reducing engine drag on an engine housing disposed in an exterior airflow comprising the following steps:

(a) forming an air inlet member for receiving engine intake air disposable within said engine housing, the air inlet member comprising a plurality of noise reduction cells, the noise reduction cells defining a maximum cross sectional air flow area, the air inlet member further comprising a plurality of pressure conduits, the noise reduction cells corresponding to and in fluid communication with respective ones of the pressure conduits, the pressure conduits defining a maximum cross sectional airflow area, and the maximum cross sectional airflow area of each of the noise reduction cells being greater than the maximum cross sectional airflow area of each of the pressure conduits;

(b) forming an air exit port disposed in fluid communication with said air inlet member to reduce the external engine drag, said air exit port being formed into a first exit portion and a second exit portion;

1) said first exit portion being formed to direct intake air from said pressure conduits and to direct intake air substantially in the direction of exterior airflow, to reduce external engine boundary layer separation drag; and 2) said second exit portion formed to direct intake air from said pressure conduits and to direct intake air substantially in a direction perpendicular to the exterior airflow,; and (c) regulating intake airflow through said air exit port in response to sensed external engine conditions to mitigate the external engine drag.

21. A method for selectively reducing turbo engine boundary layer separation drag and friction drag on an engine housing disposed in an exterior airflow comprising the following steps:

(a) forming an air inlet member for receiving engine intake air disposable within said engine housing;

(b) forming a first air exit port disposed in fluid communication with said air inlet member, adapted to direct intake air from said air inlet member and to direct intake air substantially in the direction of exterior airflow, to reduce the external engine boundary layer separation drag;

(c) forming a second air exit port disposed in fluid communication with said air inlet member, adapted to direct intake air from said air inlet member and to direct intake air substantially in a direction perpendicular to the exterior airflow, to reduce the external engine friction drag; and (d) regulating intake airflow through said first and second air exit ports in response to sensed external engine conditions to mitigate at least one of the external engine boundary layer separation drag and the external engine friction drag.

* * * * *